United States Patent [19]

Hobart et al.

[11] 3,995,166

[45] Nov. 30, 1976

[54] OPTICAL SCAN PATTERN GENERATOR FOR CODE READING SYSTEMS

[75] Inventors: James L. Hobart; Wayne S. Mefferd, both of Los Altos Hills, Calif.

[73] Assignee: Coherent Radiation, Palo Alto, Calif.

[22] Filed: Apr. 16, 1975

[21] Appl. No.: 568,633

[52] U.S. Cl. .......................... 250/566; 235/61.11 E; 250/568; 340/146.3 F
[51] Int. Cl.² .......................................... G06K 7/10
[58] Field of Search ........... 250/556, 566, 568, 236; 350/6, 7; 235/61.11 E; 340/146.3 F, 146.3 Z

[56] References Cited
UNITED STATES PATENTS

| | | | |
|---|---|---|---|
| 3,728,677 | 4/1973 | Munson | 235/61.11 E X |
| 3,731,106 | 5/1973 | Mansell | 250/236 |
| 3,823,326 | 9/1974 | Plockl | 250/568 |
| 3,889,102 | 6/1975 | Dahlquist | 250/568 X |
| 3,899,687 | 8/1975 | Jones | 250/568 |
| 3,902,048 | 8/1975 | Fleischer et al. | 235/61.11 E |
| 3,947,816 | 3/1976 | Rabedeau | 340/146.3 F X |

OTHER PUBLICATIONS

B382,783; Jan. 1975; Bowen et al.

*Primary Examiner*—Eugene La Roche
*Attorney, Agent, or Firm*—Limbach, Limbach & Sutton

[57] ABSTRACT

A reader-scanner system using a laser as a source of a narrow beam of light and having optical means for directing the light beam from the laser to a scan target area with the optical means generating a pattern comprising a series of intersecting diagonal and horizontal lines relative to the path of objects which pass through the scan target area, with sequential scan pattern sets in the scan target area displaced in the direction of oncoming objects from the previous scan pattern set, with each of the lines defining each scan pattern set approaching the scan target area from a different direction and wherein the optical path of the incoming scan lines is shared by the reflected light as it travels to the system's optical detector.

8 Claims, 5 Drawing Figures

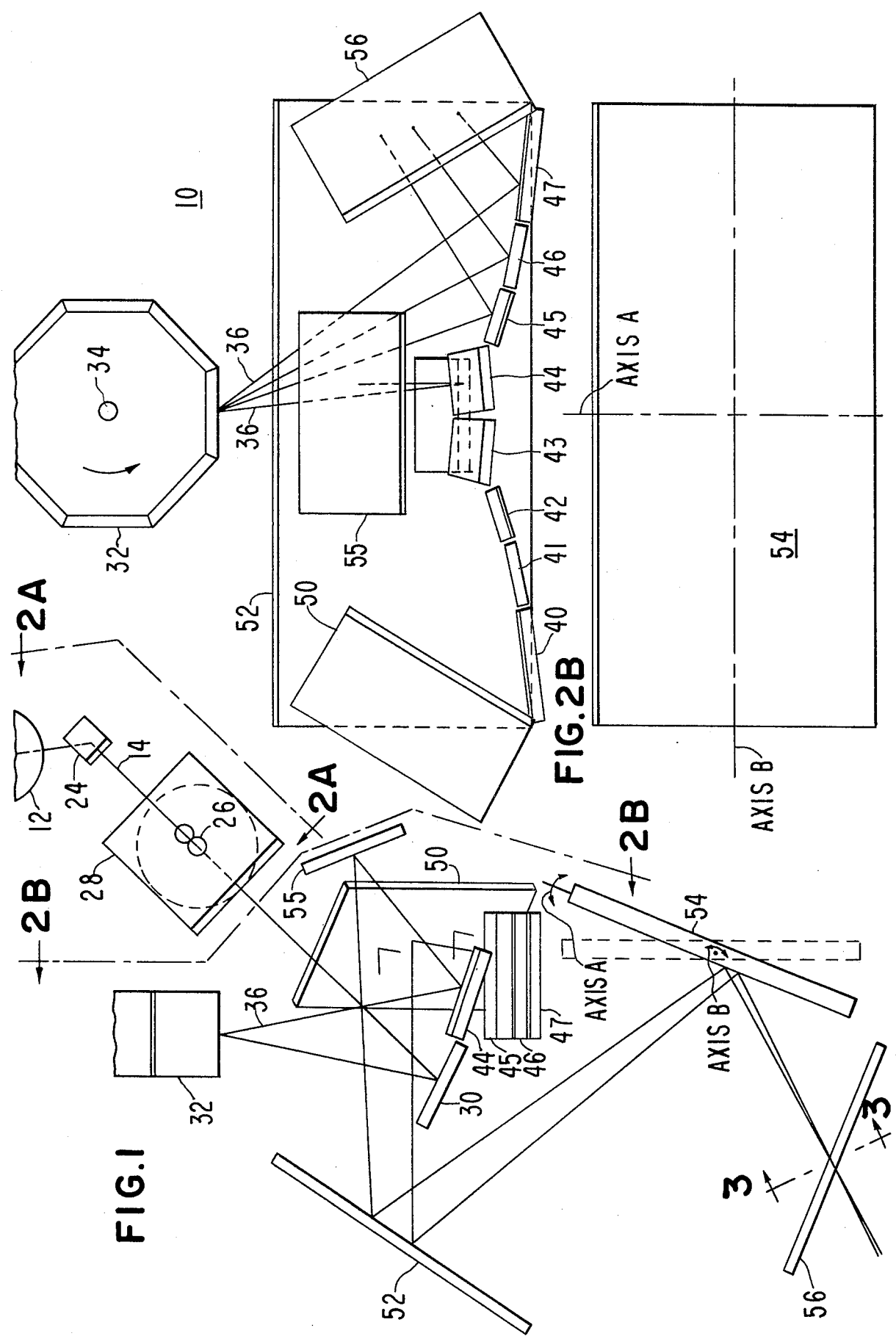

DIRECTION OF LABELS

OPTICAL SCAN PATTERN GENERATOR FOR CODE READING SYSTEMS

BACKGROUND OF THE INVENTION

The present invention relates to optical reader-scanner systems and, in particular, for improved means for generating optical scan patterns.

Optical reader-scanner systems have achieved applications at automated supermarket check-out counters. A reader-scanner system operates as a data input system for electronic cash register systems and is used to read UPC (universal product code) symbols on the items.

The UPC symbol system was developed by the Universal Grocery Product Code Council, Inc., and is a bar code system which provides for binary coding of ten decimal digits. The first five of these digits identify the producer of the item, and the last five identify the particular item of his product line. The actual symbol of the group is more than sixty parallel light and dark bars. Each of the ten digits used to identify the item is represented by a specific group of these bars and the actual encoding of the digit is obtained by variation in widths of bars making up this group.

In some cases, lesser numbers of digits are used and provisions have been made for utilizing greater numbers of digits for future codification.

The reader-scan system contributes to the efficiency and convenience of the operation of automated check-out counters by allowing the UPC symbols to be read automatically as a package is manually transferred from the counter, across a scan pattern area or window.

In automatic electronic cash register systems, the data covering such things as pricing, quantity or coupon discounting and taxable or non-taxable nature of the item are stored in a memory bank of a controller console. The controller is programmed so that the address of this memory bank location corresponds to digital information encoded in the UPC symbol printed on the package of the item.

Typically, the scan pattern system uses a very low-powered laser, such as a helium-neon laser, to provide a coherent beam of monochromatic light. This type of light source provides the high level signal-to-noise ratio necessary for processing that is unavailable from other sources. The laser beam is then directed to a scanner mechanism which generates an optical scan pattern at a window in the check-out counter.

The actual identification of the symbol is made by electronically analyzing the signals generated by the laser light beam that is reflected back from the package surface to an optical detector which, in prior art systems, is typically a photo-multiplier tube. The output of this tube then goes to electronic circuitry and is continuously analyzed for the UPC symbol coded content.

When the high speed movement of the light beam crosses the light and dark bars of a UPC symbol, a specific pulse train waveform is generated. The characteristics of this waveform are established by the width of the individual light and dark bars and by the speed of the sweep. If the electronic circuitry determines that the symbol is valid and positive identification of the symbol is made, the signal is passed on to the controller of the cash register system. This output signal provides the address for the memory bank location where the instructions, for billing and cash register-receipt recording of that symbol, are stored.

If the symbol is not valid, i.e. has been tampered with, the positive identification cannot be made, a no-reading visual or audio alarm is sounded. This notifies the clerk that a visual identification and a manual cash register entry must be made.

The information from the UPC code is retrieved by detecting the diffusely scattered light, which is then spatially modulated in intensity as a function of the absorption coefficient of the inks used on the label. There is also a component of fresnel or specular reflection; this contains no information because, while inks have widely varying absorption coefficients, variations in reflectivity are slight, except with metallic materials. Optical reading of graphic symbols, therefore, depends on illumination of the label, detection of diffuse scattering, and demodulation of the spatially-intensity distribution as a function of absorption.

Reading the symbol is further complicated by the variety of ways in which the package can be moved across the scanning aperture in the check-out counter. This variety requires that the scanner has sufficient depth of field to read labels at varying distances from the reading aperture, sufficient speed to read at symbol velocities up to 100 inches per second, and pattern density sufficient to allow reading at random orientations and positions across the aperture. The reader must also have high resolution capable of reading graphically printed symbols having several line-pairs per millimeter.

Of importance is the optical scan pattern projected on the counter window or aperture. The laser beam spot must be small enough to resolve the line width of the UPC symbols. The scan pattern must have at least several inches depth of field, insuring that the UPC symbol will be scanned by the pattern even as it is moving at a rate of up to one hundred inches per second, the ability to read symbols on the side or bottom of a package, the ability to read symbols on a package rotating while moved across the scanner and insensitivity to ambient light so that the working area can be sufficiently bright as required in the store. At the same time, the laser power must be low enough to meet federal and state safety standards.

Additionally, the system must be designed so as to minimize the deleterious effect of specular reflection, to provide sufficient capture of reflected light from the scanned object, and utilize a minimum amount of moving parts to minimize expense and insure reliability.

Presently, there are at least three scan patterns utilized in optical reader-scanner systems. These are shown and described in an article entitled "Reading the Supermarket Code" by A. Hildebrand, *Laser Focus*, September 1974, pp. 10–18. These three patterns are referred to as the *x*, the sinusoidal or lissajous pattern, and the switch pattern.

The *x* scan pattern is probably the easiest to generate of all of these scans. On the negative side, this pattern requires a large window depth, may "lose" labels if they are rotated during passage and also achieves only a few scans of labels in many orientations.

The sinusoidal or lissajous pattern is generated by two reciprocating mirrors, or one reciprocating and one spinning mirror, and is a natural outgrowth of the desire for a narrower window. The resulting pattern is essentially a series of overlapping smaller crosses. Such a system is described in an article "Laser Scan Identifies Supermarket Items" by E. J. Stefanides, *Design Ideas*, Feb. 3, 1975. pp. 28–9.

This pattern is moderate in its difficulty of generation. It is reasonably efficient in the number of scans projected, but suffers near the peaks of the sine wave due to speed variation. It achieves only a few scans of labels in certain orientations.

The so-called "stitch" pattern consists of a series of parallel vertical line segments and a horizontal line segment, with respect to the direction of travel of the package across the counter window. This pattern also has significant deficiencies. It does not achieve a uniformly high number of scans for all orientations of a package passing over the scan pattern window. It requires orientation for magnified labels as well as truncated labels. It will not read labels with imperfections along a given line if the label is moving along that line. It provides little immunity to window damage or specular reflection. The system has low immunity to background light.

The optical systems for generating each of the scan patterns referred to above have several other things in common which detract from their performance. In each case, the scan lines forming the pattern all originate from the same point in space. In other words, if one were to view the pattern as it passes over the scan pattern window, it would appear that the position of the source of the light is the same for each of the segments of the scan pattern. This has several important disadvantages.

First, it means that the output power of the laser must be reduced in order to meet safety power requirements. Secondly, since the light originates from the same point, the scans on the scan window all strike the window at approximately the same angle. In other words, all of the lines forming the pattern come from approximately the same direction. This can result in problems caused by specular reflection. Having the light beam originate from the same point also makes it less efficient in trying to scan labels which are poorly oriented as they pass the scan window. This is particularly true of curved labels.

Another common characteristic of the delivery systems for producing these patterns is that the optical system for gathering light reflected from the labels is independent of the optics delivering the laser beam to the label. By this, it is meant that the reflected light does not follow an optical path common with the impinging light. Thus, while the laser beam impinges upon the target in the form of a narrow beam of light, the optical detection scheme is provided which must have a large collection-cone angle to enhance detectivity of the reflected light. Unfortunately, this also means that additional ambient light is introduced in addition to the light providing the label information. This makes filters necessary to cut out the background light. Since this approach requires the imaging a large volume in space, very sensitive light detectors, namely photo multipliers, are required. This introduces a significant expense into the detection apparatus.

SUMMARY OF THE INVENTION

It is therefore an object of the invention to provide improved apparatus for projecting a multiple-line scan pattern in a reader-scanner system.

Another object of the invention is to provide apparatus for projecting a multiple-line scan pattern in a reader-scanner system capable of operation in high ambient illumination, including direct sunlight.

Another object of the invention is to provide reader-scanner apparatus having a large depth of field.

Another object of the invention is to provide a reader-scanner system capable of reading labels exhibiting high specular reflectance.

Another object of the invention is to provide an improved reader-scanner system capable of reading data labels of all sizes and orientations, including labels which have been severely truncated.

Another object of the invention is to provide an improved reader-scanner capable of validly scanning labels moving rapidly across the scanner window and for providing a maximum percentage of good reads as the label passes the scanner window.

Another object of the invention is to provide apparatus for projecting a multiple-line scan pattern and a reader-scanner system which can be constructed for a comparatively low cost using inexpensive light detectors and yet is highly reliable.

Another object of the invention is to provide a reader-scanner using a higher power laser source while maintaining the average power per unit area at the scan target area below the maximum amounts permitted by safety regulations.

In accordance with the present invention, a reader-scanner system includes optical means for directing a laser beam to the scan target area as a multiple-line scan pattern comprising a series of intersecting diagonal and horizontal lines, relative to the path of the objects which pass through the scan target area. Further, each such set of n-scan lines forming a pattern is displaced from or in a different orientation from the previous n-line scan pattern.

The advantage of the intersecting diagonal lines plus horizontal lines is that a large number of scans of all labels in all orientations is achieved, thus evening out and filling in the holes in a pattern where certain orientations are scanned only a few times. It achieves reads of truncated labels which could slip through other patterns. It also minimizes problems with label imperfections along certain lines.

Preferably, sequential patterns are each formed of n-scan lines displaced in a direction towards the oncoming object being scanned. This increases the probability that an object passing through the scan pattern will, in fact, be scanned.

Further, the optics are arranged such that although the light beam originates from a single source, i.e. a laser, the laser beam is re-arranged so that each of the lines which defines the scan pattern appears to originate at a different point in space. In other words, each of the lines forming the scan pattern approaches the scan target area from a different direction.

The fact that each of the scan lines originates from a different point also has important advantages. As contrasted with scanners in which the pattern appears to diverge from a single origin, this approach has the advantages that, first, scanning further around cylindrical, side-labeled objects is achieved whether the object is side scanned or tipped to present the label parallel to the window. Secondly, it eliminates the problem of specular reflectance, since a label orientation which is specularly reflecting in one scan line will not be in another. Third, from a safety standpoint in determining the total amount of energy emitted toward an operator looking into the scan pattern window, if the beam originates from the same point, all of the scan lines must be cumulatively added together. Where the beams originate from different points, the effective beam strength from a safety standpoint is reduced by a factor equal to the number of different points of origin. This enables a more powerful laser beam to be used which, in turn, results in the ability to use a cheaper detector and also makes it easier to distinguish the beam from ambient light.

Successive scan patterns are also generated in different orientations and positions at the scan window and in the scan volume. This has several advantages also. First, it fills in the scan pattern insuring acquisition of small labels and even up to 50% truncated labels. This advantage is greatest if successive scan patterns "move" in the direction of oncoming labels being scanned. Secondly, it minimizes the effect of window damage or dirt since the imperfection will affect only one of a large number of scans and valid scans will still be obtained with the others. This is in sharp contrast to other scan pattern arrangements which require orientation of magnified and/or truncated labels and in which a single scratch on the window may prevent scanning of all labels crossing the window in the vicinity of the scratch. Thirdly, it helps insure acquisition of labels which are rotating as they pass through the scan pattern area.

In accordance with another aspect of the present invention, the detector or receiver optics and the laser beam generator or scanner share the same optical path. This means that the field of view and the angular acceptance of the detector is highly restricted which, in turn, insures a high rejection of ambient light while maintaining high signal collecting power. This permits the use of low cost detectors, in lieu of the expensive photo-multipliers conventionally used. Since very little ambient light is accepted into the detector optics, it is not necessary to use filters as with conventional systems.

According to another aspect of the invention means are provided so that the beam entering the scan target area changes its angular direction during exposure so that the average power per unit area will be less than that delivered in the same time interval by a beam fixed in angular direction. As will be explained, this enables the use of higher power beam and still meet safety requirements.

BRIEF DESCRIPTION OF THE DRAWINGS

FIG. 1 is a diagrammatic representation of an optical system for projecting a multiple-line scan pattern in a reader-scanner system.

FIG. 2B is a top view of FIG. 1 as indicated by the arrows therein.

DESCRIPTION OF THE PREFERRED EMBODIMENT

Figure 2A:
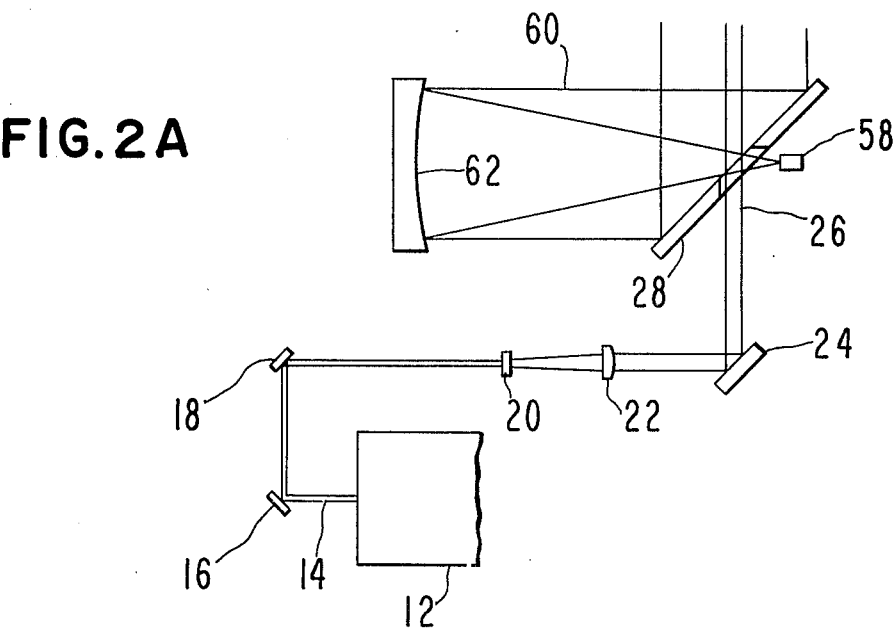
FIG. 2A, which is a view in the direction indicated by the arrows in FIG. 1, illustrates the laser and detection part of the reader-scanner system.

FIGS. 1 and 2 illustrate an optical reader-scanner 10 for projecting a scanned pattern in accordance with the present invention. A laser 12 projects a narrow, collimated beam of light 14. A helium-neon laser having an output wavelength of 6328 A such as Coherent Radiation model 80-2 is ideal for this application. After its direction is changed by 360° by first and second reflectors 16 and 18, respectively, the laser beam is collimated by a pair of lenses 20 and 22.

The collimated beam is bent 90° by a third reflector 24, and thereafter passes through an aperture 26 in an apertured reflector 28.

Referring now to FIGS. 1 and 2B, after the beam is reflected off the mirror 30, it impinges upon the periphery of a rotating eight-sided mirror 32. Mirror 32 rotates about its axis 34 so that light 36 reflected from it defines an arc plane. Situated in the arc plane are eight mirrors or reflectors 40–47. For purposes of clarity, only mirrors 44–47 are illustrated in FIG. 1. As each face of the rotating eight-sided mirror 32 intersects the laser beam, it reflects the beam first to the left hand side of mirror 40 and then along mirror 40 until it intersects mirror 41; thereafter along mirror 41 until it intersects mirror 42; and so forth until it passes off of the right hand edge of mirror 47. The next face of the mirror 32 then repeats this same sequence with the reflected beam starting at mirror 40.

The light from the mirrors 40–42 is then reflected on to a mirror 50 and thereafter onto a large mirror 52. Light from mirrors 43 and 44 is reflected onto mirror 55 and thereafter onto mirror 52. Similarly, the light from mirrors 45, 46 and 47 is reflected from mirror 56 upon mirror 52.

Figure 3:
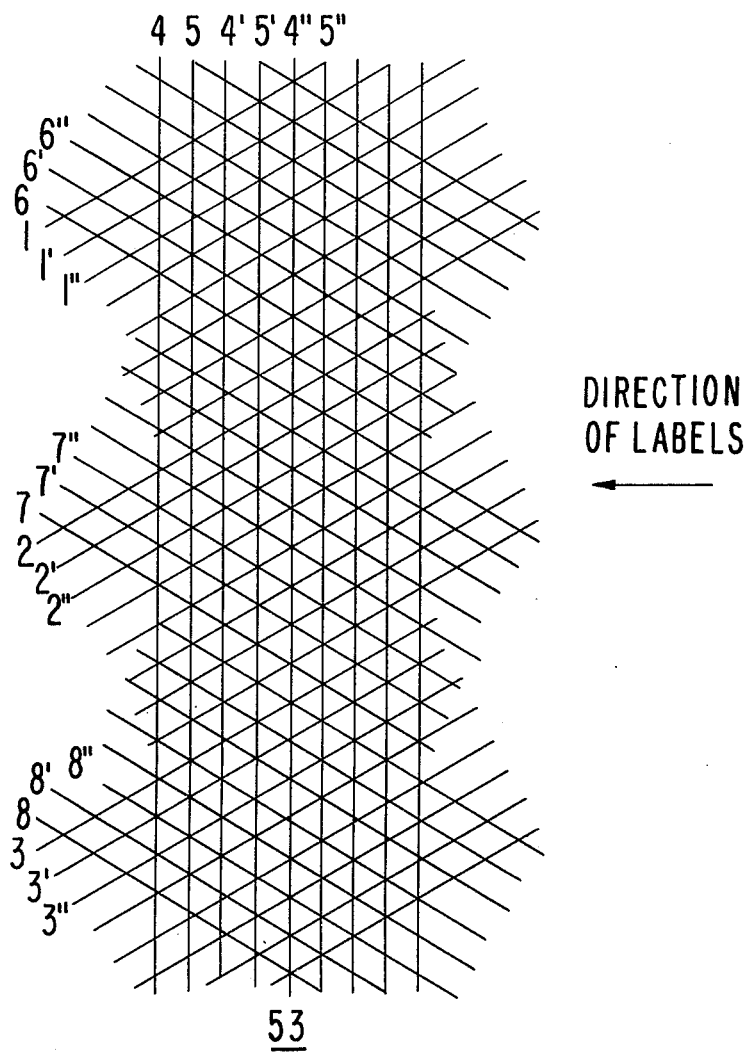
FIG. 3 is an illustration of the scan pattern as it appears when viewed in the direction indicated by the arrows in FIG. 1.
Figure 4:
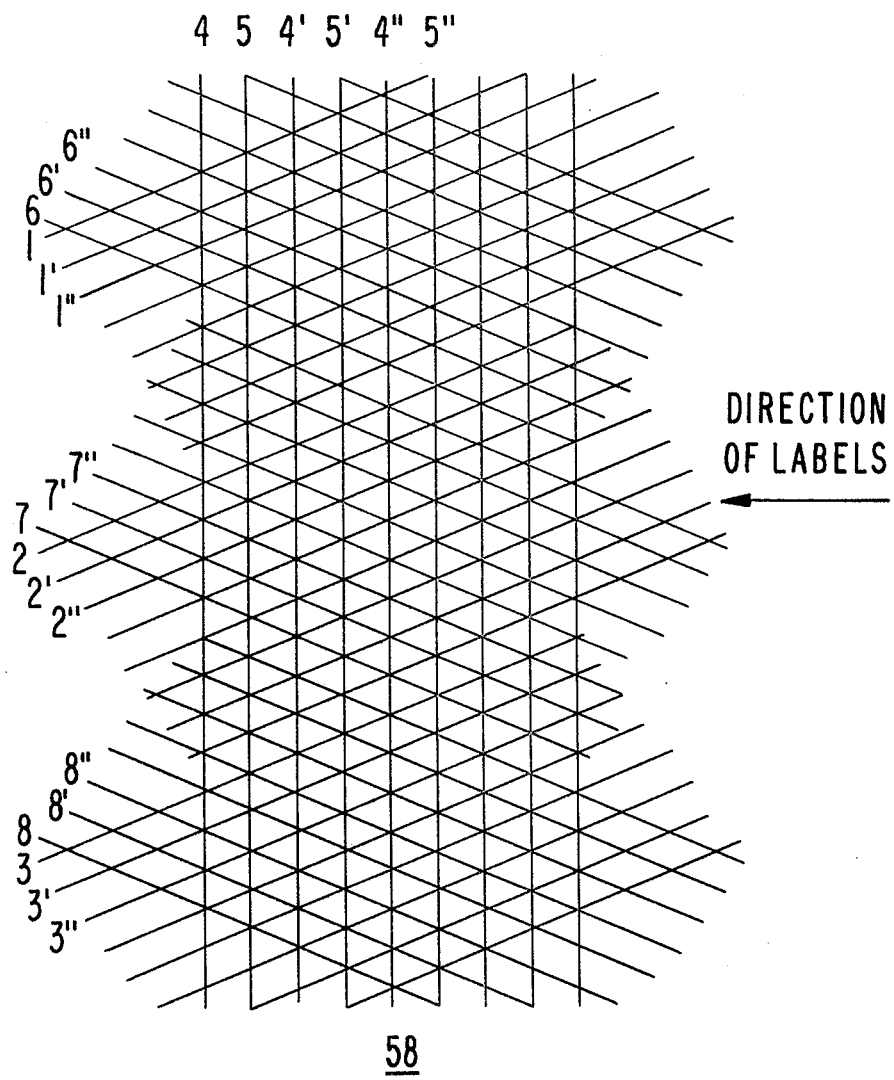
FIG. 4 is an illustration of the scan pattern as it appears at the scanner window.

The pattern 53 reflected by mirror 52 is shown in FIG. 3. The image is reflected one more time by another mirror 54 before exiting through the scanner window or aperture 56. The sole function of the mirrors 52 and 54 is to get the beam pattern in the proper orientation with respect to the window 56. Since the pattern is projected obliquely upon the window 56, it is somewhat flattened from the pattern 53 shown in FIG. 3. The resulting pattern 58 actually displayed on the window 56 is shown in FIG. 4.

The derivation of the pattern shown in FIGS. 3 and 4 will now be explained. As explained previously, the light reflected from one of the faces of the rotating mirror 32 first strikes the left hand side of mirror 40. Mirror 40 is situated at such an angle that when the light is reflected from mirror 50 and subsequently through mirrors 52 and 54, the resulting line segment is shown as line 1 in FIGS. 3 and 4. As the eight-sided mirror 32 rotates in the direction indicated by the arrows, light is next reflected from mirror 41. Mirror 41 has a different angular orientation than that of 40 and as a result, the line segment reflected from it is displaced in the scan area from that reflected from mirror 40. This diagonal line is indicated as the number 2 line in the patterns shown in FIGS. 3 and 4.

Next, the beam sweeps across mirror 42 resulting in the diagonal line number 3. Mirror 43 is angularly situated such that the light reflected from it to mirror 55 is projected as a horizontal line numbered 4 in FIGS. 3 and 4. Mirror 44 has a slightly different angular orientation from mirror 43 so that when the beam from the mirror 32 sweeps across it, the resulting horizontal line 5 is displaced from line 4 reflected from mirror 43. Actually, with mirrors 43 and 44 oriented as shown, perfect horizontal lines will not be generated at the scanner window. Rather, two nearly horizontal lines will be generated whose angular difference causes them to be displaced from each other. If exact horizontal lines are desired, mirrors 43 and 44 should be parallel with each other with one slightly displaced towards the rotating mirror 32.

The beam from mirror 32 then sweeps successively mirrors 45, 46 and 47 which are reflected from mirror 56 and eventually form lines 6, 7 and 8 in the scan pattern.

At this point, the light impinging upon the rotating reflector encounters a new face. Each of the faces of the rotating mirror 32 is at a slightly different angular orientation, with respect to the axis of rotation, from the previous face. In particular, it is advantageous to have the normal to any minor face, at the center of the face, intersect the axis of rotation but at a different angle for each face. Since this angular difference is quite small, this is not shown in FIG. 2B. As a result, when the next beam sweeps across mirrors 40–47, the entire pattern is shifted from the previous pattern. Thus, for example, the scan line segment from mirror 40 is indicated as 1' in the scan patterns of FIGS. 3 and 4. Similarly, the numerals 2' through 8' indicate the line segments reflected from mirrors 41–47, respectively from the second face. The third face generates the pattern indicated by the numerals 1'' through 8''. The amount of displacement of each pattern can be varied by varying the angle of each of the faces of the rotating mirror 32.

When the fourth face intersects the light beam directed at it, the fourth eight-line pattern will be similarly shifted and this continues as each of the mirror faces rotates and intersects the laser beam. For purposes of clarity, only three sets of lines are specifically numbered in FIGS. 3 and 4. It will become apparent, however, that each eight-line pattern formed by the rotating faces is displaced to the right of the previous pattern. With the labels moving in the direction from right to left in FIGS. 3 and 4, it can be seen that the effect is that the patterns are moving towards the oncoming labels. The advantages of this scan pattern movement, especially toward oncoming labels have been described previously.

As explained previously, the scanning system of the present invention employs a retro-reflective optical system. By this it is meant that light which is reflected off an object passing over the window 56 is conveyed back to a photo-detecting device 58 along the same optical path as the incoming beam. Referring now to FIG. 2A, when the reflected light 60 reaches the apertured mirror 28, most of it is reflected thereby to a concave mirror 62 which, in turn, focuses the beam so that it passes through the aperture 26 to reach the detector 58. By using a retro-reflective optical system, only a very narrow light image is returned to the detector, thereby reducing the amount of ambient light which is captured which, in turn, allows the detector 58 to be a simple photo-detector rather than a photo-multiplier. Also, it is not necessary to use special filters to remove ambient light.

As explained previously, mirrors 40–47 have the effect of breaking up each arcuate scan of the multiple faceted mirror 32 into a series of diagonal and horizontal lines which are displaced with respect to each other. Another effect of this mirror arrangement is that it has the effect of causing each line in the scan pattern to be projected from a different direction. Put another way, it has the effect of causing the laser beam to originate from eight different points in space instead of one. Thus, if one were to look directly into the window 56, one would see eight spots corresponding to the image of the spot on the rotating mirror 32 on each of the mirrors 40–47. As explained earlier, since the beams forming the scan pattern appear to originate from different points in space, it is possible to use a higher powered laser and still meet the safety requirements set by state and federal laws. Also, by reaching the label from different directions, it is possible to make valid scans in labels having curved or truncated surfaces.

The reduction in average laser intensity achieved by this technique allows one to use a higher power beam with a consequent increase in signal-to-noise ratio. Even further increases in beam power and consequent improvement in signal-to-noise ratio may be achieved by taking advantage of an alternate portion of federal, state and other regulations controlling the amount of laser power which may be radiated. These laser safety regulations generally recognize the fact that the threshold for injury to the eye is dependent upon the power or energy per unit area on the retina. Thus, a single laser beam which enters the eye in a fixed direction will be focused to a given spot size on the retina and remain stationary there, giving a fixed amount of power or energy per unit time in this region of the retina. If, however, the beam changes the angular direction in which it enters the eye, it will impinge upon a different spot on the retina, where it will produce approximately the same power per unit area but will not be additive with the original beam. Conversely, if a laser beam of fixed power is made to change in angle while entering the eye during some exposure time, the average power per unit area on the retina during the exposure time will be reduced by a factor proportional to the angular change which the beam makes during the exposure time.

In the case of a beam which moves in such a fashion that it covers during the exposure time a given solid angle, the reduction in average beam power or energy per unit area during the exposure time will be in the ratio of the solid angle covered by the moving beam during the exposure time to the larger of (1) the solid angle determined by the laser beam's angular divergence when traveling at a fixed angle, or (2) the solid angle determined by the divergence of a beam which would focus to an area on the retina limited by the eye's resolution.

This situation is recognized in most laser safety specifications and, in particular, in the impending federal safety regulations by limiting either (a) the maximum amount of energy which may enter the eye in a fixed angular direction during a given time interval, or (b) the maximum amount of energy per unit solid angle which may enter the eye during a given exposure time. As previously explained, if a beam entering the eye changes its angular direction during exposure, the average power per unit area will be less than that delivered in the same time interval by a beam fixed in angular direction. Therefore, by changing the angle of the laser beam during exposure, a higher power beam may be used which will still produce less average power per unit area on the retina than a lower power beam fixed in angular direction. It is another object of the present invention to provide optical means whereby the beam or beams change their angular direction with time, thus permitting the use of higher power lasers while maintaining the average power per unit area delivered to the retina of a person viewing the scan pattern to amounts below the maximum amounts delineated by laser safety standards.

In laser scanners intended to read the UPC label described earlier, it is generally the situation that laser beam powers which provide adequate signal-to-noise ratio emit powers which are below established safety limits for exposures ranging from 10 to 1,000 seconds but exceed the safety limits for exposures up to 10,000 seconds.

One technique for maintaining the average power emitted from the scanner below the limits set by federal and/or state regulations for the longer exposure times is to provide means for automatically turning the beam or scan pattern on when the scanner senses that an item is entering the scanned area and to turn the beam or scan pattern off either when a valid UPC label has been recognized or it is determined that the item has left the scan area. If the number of items being passed through the scanner per unit time is low, then laser radiation will be emitted less than 100% of the time. In this case, the average emitted radiation will be reduced and may fall below the maximum values permitted by existing or impending regulations.

If, however, items are being passed through the scanner at a higher rate, the average power emitted may exceed the above mentioned limits. To meet current or impending standards, means must be provided in the scanner to determine the average on-time of the scanner and consequently the average power emitted, and to turn the scanner off if the average power is too high. This obviously limits the number of items per unit time which may be scanned, which reduces the effectiveness of the instrument. In addition, the means for determining the average on-time of the scanner adds additional cost and complexity to the device. It is the object of this present invention to provide means whereby changing the angular orientation of the output beam or beams, the emitted power or energy per unit steradian is reduced to a level which is below safety limits and thus permits the machine to be used continuously.

One means for accomplishing this is to simultaneously oscillate mirror 54 of FIG. 28 about two axes labeled in FIG. 2B as Axis A and Axis B. To insure that the solid angle filled by the angular excursions of the beam is as large as possible one can choose the frequencies of oscillation about the two axes to have a ratio several times larger than the larger ratio of the angular excursion about either axes A or B to the angular divergence of the laser.

Oscillations of mirror 54 in the manner described above is easily achievable. One way is to use a pair of cams, each rotating at different rates. Cam followers associated with each cam cause the respective oscillations about the two mirror axes.

The proper angular relationship of mirrors 40–47 as well as the other mirrors will depend upon the over-all configuration and size of the particular scanner applications. In one actual embodiment, the nominal angles between the faces of mirrors 45–47 and a line parallel with the reflecting face of mirror 32 when in the position shown in FIG. 2B are: mirror 45 at 19.1°, mirror 46 at 12.5°, and mirror 47 at 5.9°. The angle of mirror 42 corresponds to that of 45, mirror 41 to 46 and mirror 40 to 47, except in the opposite direction from this line.

For exact horizontal lines, mirrors 43 and 44 are each parallel to this reference line. In the embodiment shown, the mirrors 43 and 44 are at slight angles to this line to achieve nearly parallel lines.

In this same actual embodiment, the rate of oscillation of mirrors 54 about axis A is 1 cycle/hour and about axis B is 1 cycle/min.

What is claimed is:

1. Apparatus for generating a multiple-line scan pattern in a reader-scanner system comprising:
    a. a laser for projecting a narrow beam of light;
    b. a scan target area through which pass objects to be scanned;
    c. means for detecting changes in the level of laser light reflected from objects passing through said scan target area; and
    d. optical means for directing said laser beam to said scan target area as a set of n intersecting line segments forming one complete scan pattern spanning the entire scan target area and including means for projecting subsequent complete sets of n-line scan patterns at a different orientation in said scan target area from the previous n-line pattern in a direction toward oncoming objects passing through said scan target area.

2. Apparatus as in claim 1 wherein each n-line scan pattern comprises a series of intersecting diagonal and horizontal lines relative to the path of objects passing through said scan target area.

3. Apparatus as in claim 1 wherein each n-line scan pattern comprises a series of intersecting diagonal and substantially horizontal lines relative to the path of objects passing through said scan target area.

4. Apparatus as in claim 3 wherein said optical means includes means for directing each line of each n-line scan patern from a different point in space.

5. Apparatus as in claim 4 wherein said optical means provides an optical path common to both light directed to said scan target area as well as light reflected therefrom.

6. Apparatus as in claim 5 including means for reducing the power per unit/solid angle at said scan target area by angularly moving said pattern in at least one direction.

7. Apparatus for projecting a multiple-line scan pattern in a reader-scanner system comprising:
    a. a laser for projecting a narrow beam of light;
    b. a scan target area through which pass objects to be scanned;
    c. means for detecting changes in the level of laser light reflected from objects in said scan target area; and
    d. optical means for directing said laser beam to said scan target area as a series of intersecting diagonal and substantially horizontal lines relative to the path of the objects passing through said scan target area.

8. Apparatus as in claim 7 wherein said optical means comprises:
    a. a rotating n-sided reflector;
    b. means for directing the laser beam to impinge upon said rotating reflector;
    c. means for segmentizing each sweep of the light beam which defines an arc plane as it is reflected from sequential sides of said rotating n-sided reflector comprising m stationary reflectors located in said arc plane, and wherein each stationary reflector is at a different angular orientation therein whereby reflections from each of said m reflectors are directed out of said arc plane at a different angle thereto, and
    d. additional optical means for intercepting each of said line segments reflected from said arc plane and redirecting the same to another plane in space, whereby some of said line segments comprise intercepting diagonal lines in said latter plane, and others comprise substantially horizontal lines.

* * * * *